(12) United States Patent
Wingo

(10) Patent No.: US 6,945,500 B2
(45) Date of Patent: Sep. 20, 2005

(54) APPARATUS FOR A GEOSYNCHRONOUS LIFE EXTENSION SPACECRAFT

(75) Inventor: Dennis Ray Wingo, Huntsville, AL (US)

(73) Assignee: Skycorp, Inc., Huntsville, AL (US)

( * ) Notice: Subject to any disclaimer, the term of this patent is extended or adjusted under 35 U.S.C. 154(b) by 0 days.

(21) Appl. No.: 10/642,258

(22) Filed: Aug. 15, 2003

(65) Prior Publication Data
US 2005/0040282 A1 Feb. 24, 2005

(51) Int. Cl.$^7$ .................................................. B64G 1/26
(52) U.S. Cl. ...................................... 244/161; 244/169
(58) Field of Search ............................ 244/158 R, 159, 244/161, 169, 172, 164; 701/13

(56) References Cited

U.S. PATENT DOCUMENTS

| | | |
|---|---|---|
| 2,692,103 A | 10/1954 | Cobham et al. |
| 3,201,065 A | 8/1965 | Dunn |
| 3,262,654 A | 7/1966 | Kaempen |
| 3,286,629 A | 11/1966 | Laue |
| 3,389,877 A | 6/1968 | Huber et al. |
| 3,391,881 A | 7/1968 | Maltby |
| 3,508,723 A | 4/1970 | Warren et al. |
| 3,526,372 A | 9/1970 | Fentress |
| 3,608,848 A | 9/1971 | Cantor et al. |
| 3,709,447 A | 1/1973 | Devlin |
| 3,737,117 A | 6/1973 | Belew |
| 3,753,536 A | 8/1973 | White |
| RE27,903 E | 1/1974 | Fogarty n |
| 3,794,270 A | 2/1974 | Wilkens |
| 3,820,741 A | 6/1974 | Ratcliff |
| 3,893,573 A | 7/1975 | Fletcher et al. |
| 3,910,533 A | 10/1975 | Cheatham et al. |
| 3,952,976 A | 4/1976 | Fletcher et al. |
| 4,177,964 A | 12/1979 | Hujsak et al. |
| 4,195,804 A | 4/1980 | Hujsak et al. |
| 4,219,171 A | 8/1980 | Rudmann |
| 4,326,684 A | 4/1982 | Rosen |
| 4,381,092 A | 4/1983 | Barker |
| 4,395,005 A | 7/1983 | Ganssle |
| 4,471,926 A | 9/1984 | Steel |
| 4,500,057 A | 2/1985 | Duweiz |
| 4,556,182 A | 12/1985 | Bentall et al. |
| 4,585,191 A | * 4/1986 | Blount ....................... 244/169 |
| 4,588,150 A | 5/1986 | Bock et al. |
| 4,607,815 A | 8/1986 | Turei et al. |
| 4,682,745 A | 7/1987 | Acres |
| 4,730,798 A | 3/1988 | Wertz |
| 4,809,936 A | 3/1989 | Whitaker |
| 4,834,325 A | * 5/1989 | Faget et al. .................. 244/173 |
| 4,858,857 A | 8/1989 | Lange et al. |
| 4,860,975 A | 8/1989 | Schliesing et al. |
| 4,964,596 A | 10/1990 | Ganssle et al. |
| 5,005,786 A | 4/1991 | Okamoto et al. |
| 5,014,936 A | * 5/1991 | Nauck ..................... 244/158 R |
| 5,040,748 A | 8/1991 | Torre et al. |
| 5,040,749 A | 8/1991 | Johnson |
| 5,104,070 A | 4/1992 | Johnson et al. |
| 5,109,346 A | 4/1992 | Wertz |

(Continued)

FOREIGN PATENT DOCUMENTS

| | | |
|---|---|---|
| WO | WO 97/31822 | 11/1995 |
| WO | WO 02/08059 A1 | 7/2000 |
| WO | WO 01/18313 A1 | 9/2000 |

*Primary Examiner*—Galen Barefoot
(74) *Attorney, Agent, or Firm*—Thomas, Kayden, Horstemeyer & Risley, L.L.P.

(57) ABSTRACT

A satellite life extension spacecraft, comprising a mechanical implement adapted for connection to a parent spacecraft, a first and second boom, a first thruster pod and a second thruster pod attached to the first and second boom, the first pod positioned relative to the second pod such that the center of mass of a parent/child spacecraft can be determined relative to the first and second pod.

19 Claims, 7 Drawing Sheets

U.S. PATENT DOCUMENTS

| | | | |
|---|---|---|---|
| 5,111,748 A | 5/1992 | Thurner et al. | |
| 5,125,601 A | 6/1992 | Monford | |
| 5,145,227 A | 9/1992 | Monford | |
| 5,186,419 A | 2/1993 | Scott | |
| 5,242,135 A | 9/1993 | Scott | |
| 5,253,944 A | 10/1993 | Preston | |
| 5,299,764 A | 4/1994 | Scott | |
| 5,364,046 A | 11/1994 | Dobbs et al. | |
| 5,421,540 A | 6/1995 | Ting | |
| 5,449,211 A | 9/1995 | Monford | |
| 5,459,669 A | 10/1995 | Adsit et al. | |
| 5,511,748 A | 4/1996 | Scott | |
| 5,692,707 A | 12/1997 | Smay | |
| 5,765,780 A * | 6/1998 | Barskey et al. | 244/165 |
| 5,803,407 A | 9/1998 | Scott | |
| 5,845,880 A | 12/1998 | Petrosov et al. | |
| 5,868,358 A | 2/1999 | Nakamura | |
| 5,951,609 A | 9/1999 | Hanson et al. | |
| 5,984,236 A | 11/1999 | Keitel et al. | |
| 6,017,000 A | 1/2000 | Scott | |
| 6,032,903 A * | 3/2000 | Fowell et al. | 244/165 |
| 6,032,904 A * | 3/2000 | Hosick et al. | 244/169 |
| 6,036,143 A * | 3/2000 | Biber | 244/169 |
| 6,102,337 A * | 8/2000 | Quartararo | 244/169 |
| 6,113,035 A * | 9/2000 | Hubert | 244/169 |
| 6,135,394 A | 10/2000 | Kamel et al. | |
| 6,149,104 A | 11/2000 | Soranno | |
| 6,173,565 B1 | 1/2001 | Cassady et al. | |
| 6,205,473 B1 | 3/2001 | Thomasson et al. | |
| 6,286,787 B1 | 9/2001 | Fleeter | |
| 6,299,107 B1 | 10/2001 | Kong et al. | |
| 6,330,987 B1 | 12/2001 | Scott | |
| 6,354,540 B1 | 3/2002 | Lewis et al. | |
| 6,484,973 B1 | 11/2002 | Scott | |
| 6,565,043 B1 | 5/2003 | Wittmann | |
| 6,568,639 B2 | 5/2003 | Carpenter et al. | |

* cited by examiner

APPARATUS FOR A GEOSYNCHRONOUS LIFE EXTENSION SPACECRAFT

BACKGROUND

In the realm of spaceflight, manned and unmanned systems have been used to dock with and extend the life of, control, or dispose of other spacecraft, e.g., satellites. In this regard, an "Apollo Command/Service Module" docked with and modified the orbit of a Lunar Module, the "Atlas/Agena" unmanned booster docked with the "Gemini X," "XI," and "XII" and modified the coupled system's orbit, and "Progress" docked with, boosted, and later safely de-orbited the Russian Mir space station. In addition, Progress docks with and maintains the orbit of the National Aeronautics and Space Administration/European Space Agency/Russian (NASA/ESA/Russian) International Space Station (ISS).

Other systems have been designed to provide re-boost capabilities. For example, NASA designed an Orbital Maneuvering Vehicle in 1986 that was designed to re-boost the Hubble Space Telescope, the Gamma Ray Observatory, and other government and commercial payloads. Further, ESA is currently building the Automated Transfer Vehicle (ATV), to deliver supplies and perform re-boost for the ISS. Other efforts have recently been completed or are in progress for rendezvous and or docking of dissimilar spacecraft. The German space agency, Deutschen Zentrum für Luft- und Raumfahrt (DLR) and the National Space Development Agency of Japan (NASDA) performed an in orbit docking experiment in 1998 called ETS-VII (GETEX) which proved many concepts related to proximity operations of multiple spacecraft as well as robotic docking. They also addressed the system design issue of the momentum imparted to a combined spacecraft system by the use of robotic arms. The Defense Advanced Projects Agency (DARPA) is currently funding the Orbital Express mission as well as the "Demonstration of Autonomous Rendezvous Technology" (DART) rendezvous mission. However, none of these missions are targeted at spacecraft in geostationary orbit.

Typically, the life span of a geostationary Earth Orbit (GEO) spacecraft is upward of 15 years and is limited principally by the exhaustion of station keeping fuel. This fuel is needed in order to maintain the spacecraft's position over the earth's equator at an orbital altitude of approximately 35,800 kilometers. The orbital position of a GEO spacecraft is influenced primarily by the dissimilar gravitational forces exerted by the Earth, Moon, and Sun, hereinafter referred to collectively as "gravitational forces." Such gravitational forces result in a drift of the spacecraft from the desired orbital position, hereinafter referred to as "spacecraft drift." Spacecraft drift is unacceptable for the provision of services from these locations and it is typically desired that such drift be minimized.

Spacecraft drift comes in two forms, i.e., semi-major axis drift and inclination drift. Semi-major axis spacecraft drift results in an east/west drift from the desired orbital position and is hereinafter referred to as "east/west drift." Inclination spacecraft drift results in spacecraft displacement that is orthogonal to the semi-major axis of the spacecraft orbit. Inclination spacecraft drift requires approximately ten times the energy to correct than semi-major axis spacecraft drift. Inclination drift is hereinafter referred to as "north/south drift." Both east/west and north/south drift are typically corrected by a set of spacecraft thrusters.

In the parlance of the art, note that geosynchronous orbit refers to an orbit, whereby the orbital velocity of a spacecraft is equivalent to the rotational velocity of the Earth. A "geostationary orbit" (GEO) is a term that refers to zero degree inclination orbit around the Earth having a period of approximately 24 hours, i.e., a spacecraft in GEO orbit appears to hang motionless with respect to one's position on earth. Thus, a satellite in GEO orbit travels at a velocity equal to that of the rotation of the earth in order to remain in a relatively fixed position with respect to the earth. In order to remain in the equatorial plane (zero degree or Clarke Belt) as well as in a desired altitude (within 80 km) a propulsion system is typically employed.

It is relatively simple in energy terms to compensate for the east/west drift by firing thrusters along the velocity vector or toward nadir/zenith, because the east/west drift is a change in the eccentricity or period of the orbit. However, it is more difficult to compensate for the north/south drift described herein.

Note that the north/south and east/west drift with respect to the position of a geostationary spacecraft are completely separate from any attitude perturbations of the spacecraft that are due to gravity gradient torque, solar torque, or internal mechanical displacement torque due to the movement of components or fuel depletion in internal tanks. Such attitude displacements are typically compensated for by use of the aforedescribed propulsion system and thrusters and/or momentum management devices.

SUMMARY

Generally, the present disclosure relates to a Satellite Life Extension Spacecraft (SLES) for attachment to a parent spacecraft in GEO orbit or intended for GEO orbit.

An exemplary embodiment of an SLES in accordance with the present disclosure comprises a mechanical implement adapted for connection to a parent spacecraft, a thruster pod extension device, a first thruster pod and a second thruster pod attached to the thruster pod extension device, the first pod positioned relative to the second pod such that center of mass of a combined spacecraft comprising the SLES and a parent spacecraft can be determined relative to the first and second pod.

Further a method in accordance with the present disclosure comprises the steps of: calculating a center of gravity of a parent/child spacecraft; calculating an angle of rotation of a thruster pod about a gimbal based upon a change in one center of gravity; and changing the position of the thruster to reflect the angle of rotation calculated.

DETAILED DESCRIPTION

The present disclosure relates to a Spacecraft Life Extension System (SLES), which refers to a spacecraft apparatus used to extend the life of a GEO-bound or GEO-orbiting parent satellite. Generally, the SLES docks to the parent satellite and assumes maintenance and control operations, such as, for example, the SLES takes over the satellite's station keeping duties and/or the satellites attitude control system. Note that "station keeping" relates to tasks associated with positioning the satellite with respect to the earth in the orbit plane, and "attitude control" relates to tasks associated with orienting the satellite with respect to an earth centered or inertial reference frame.

In taking over station/keeping duties and attitude control, the SLES extends the useful life and revenue potential of the satellite, thereby bringing significant economic advantage to an operator of the satellite. For clarity, the SLES is hereinafter referred to as a "child spacecraft," the satellite is hereinafter referred to as a "parent spacecraft," and the spacecraft resulting from the SLES docking with the satellite is hereinafter referred to as a "parent/child spacecraft."

Figure 1:
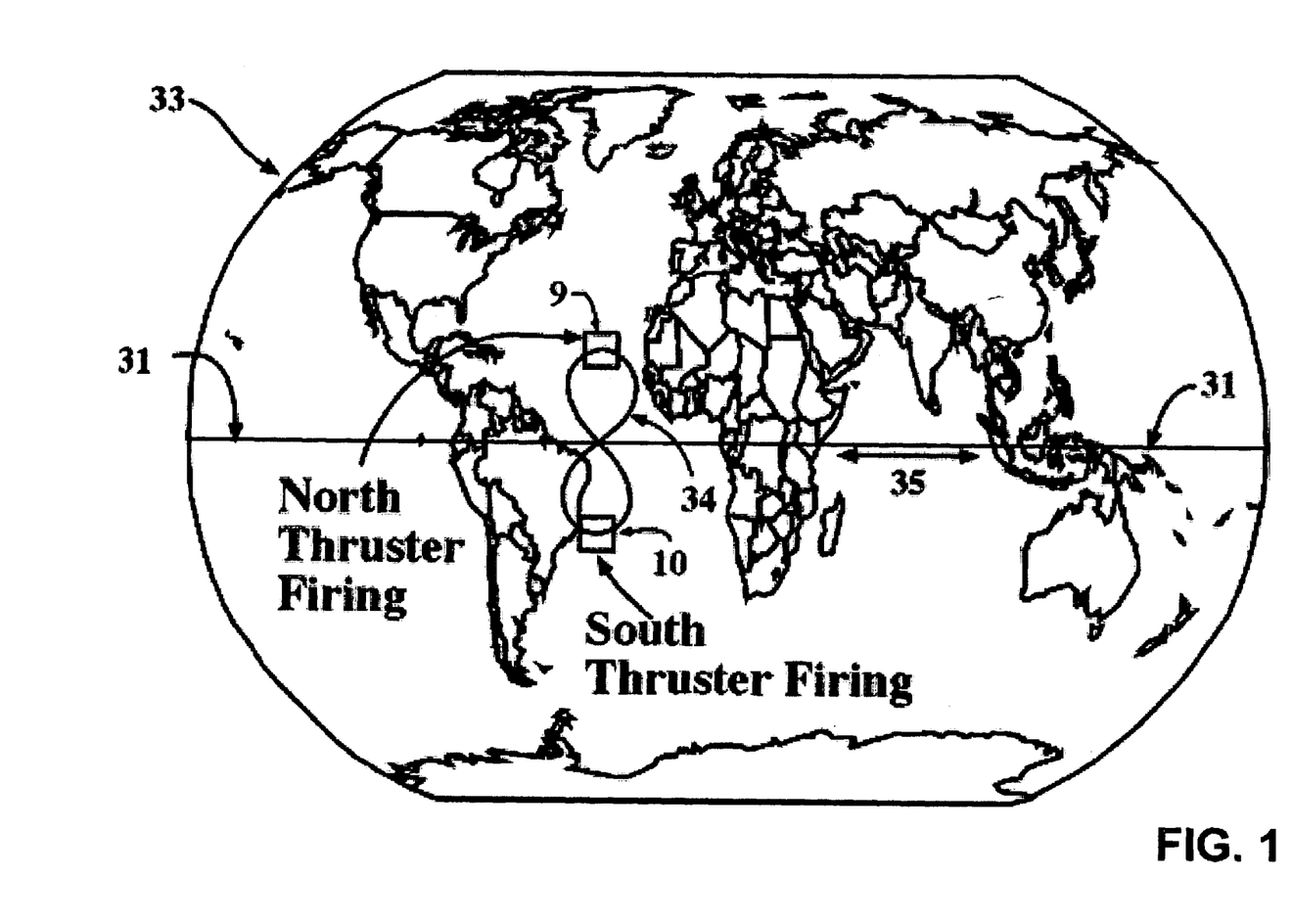
FIG. 1 illustrates an Earth centered inertial frame illustrating the figure-eight orbital path of a geostationary orbiting spacecraft with respect to an Earth centered inertial frame of reference with an inclination perturbation, which is exaggerated for clarity.

FIG. 1 shows generally an earth 33 and a line 31 representative of the equatorial plane of the earth 33. A satellite in GEO orbit travels along the line 31 at a velocity, which enables the satellite's position to remain relatively static with respect to the earth 33. In so traveling along line 31, a satellite in GEO orbit also travels along the figure-eight path 34 due to gravitational forces of the Earth 33, Moon (not shown) and Sun (not shown). Hence, the satellite comprises a propulsion system, whereby when the satellite is in the north loop 9 of the figure-eight 34, one propulsion system of the satellite activates. Such a propulsion system fires thrusters in order to direct the satellite back to the GEO orbit along the line 31. Likewise, when the satellite is in the south loop 10 of the figure-eight, the propulsion system fires thrusters in order to direct the satellite back to the GEO orbit along the line 31. Perturbations of the satellite along the line 31 indicative of the east/west drift 35 are compensated for by thrusters that fire either forward or opposite to the orbital path or orthogonally in the nadir/zenith direction.

In this regard, the propulsion system corrects the north/south and east/west drift of the satellite in GEO orbit with the thruster action described hereinabove, and such correction is preferable when providing station keeping for the satellite. Moreover, when a child spacecraft attaches to a parent spacecraft forming a parent/child spacecraft, such station keeping tasks become more difficult for a combined parent/child spacecraft, i.e., correcting the displacement becomes more difficult for the parent/child spacecraft. Correction of the north/south drift of a parent/child spacecraft in accordance with an exemplary embodiment of the present disclosure is described in more detail with reference to FIG. 5.

Figure 2:
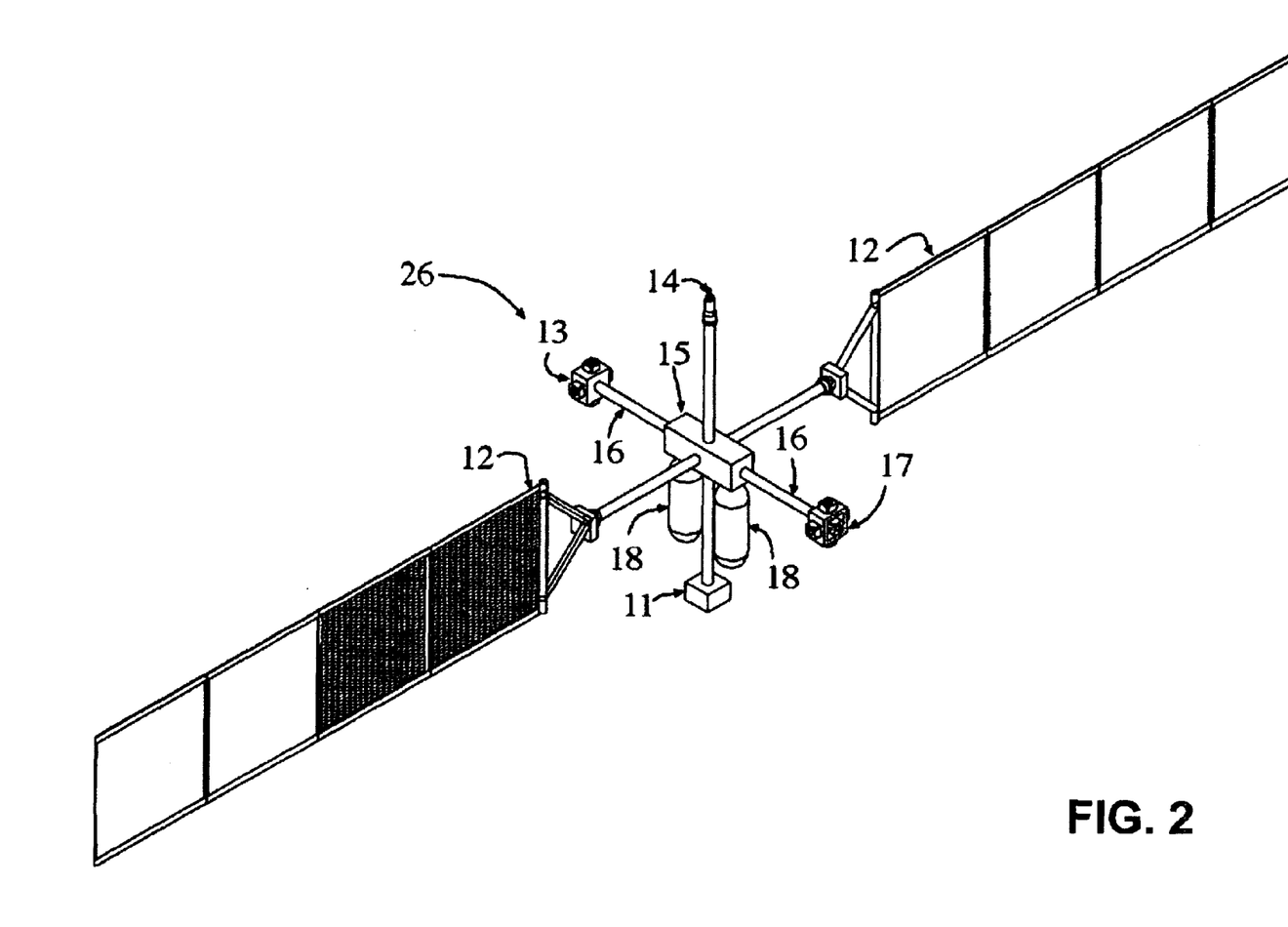
FIG. 2 is a simplified representation of an exemplary satellite life extension system (SLES) in accordance with the present disclosure.

FIG. 2 illustrates an exemplary child spacecraft 26 of the present disclosure. Generally, the child spacecraft 26 comprises solar arrays 12, a control box 15, a primary thruster 11, fuel tanks 18, a pair of extendable booms 16, a pair of thruster pods 13 and 17, described in more detail with reference to FIG. 3, and a capture tool 14. Note that the length of the extendable booms 13 and 17 can be varied corresponding to the size of a parent spacecraft to which it is going to attach.

The primary thruster 11 can comprise any thruster known in the art or future-developed, e.g., a BPT-4000 manufactured by Aerojet or a BP-140 manufactured by Pratt Whitney. Further, the fuel tanks 18, which store the fuel for the child spacecraft, e.g., Xenon, may be obtained from Lincoln Composites and have a storage capacity of 83 or 140 kilograms. However, the present disclosure is not limited to a tank of the aforedescribed type. In this regard, other tanks are available from other manufacturers. Further, the number of tanks implemented on the child spacecraft can vary as needed for any particular mission and within the constraints of a launch vehicle. Note that the launch vehicle refers to a spacecraft that transports the child spacecraft 26 from earth 33 (FIG. 1) into a GEO transfer or other orbit.

The thruster pod pair 13 and 17 are mounted out on the extendable booms 16. Each thruster pods 13 and 17 preferably comprises five "Hall-effect thrusters" as further described with reference to FIG. 3. A Hall-effect thruster is a type of electrostatic thruster in which Xenon ions are accelerated by an electromagnetic field.

More specifically, the thruster pods 13 and 17 take energy generated by the solar arrays 12, batteries, or other energy sources, and converts that energy into momentum by accelerating Xenon or other atoms stripped of outer shell electrons to high velocities in a magnetic field. This could also be accomplished by using a grid ion propulsion system utilizing electrostatic acceleration of similarly ionized atoms.

This form of propulsion is dramatically more efficient than chemical propulsion systems and allows for a reduction in spacecraft mass to the point where the child spacecraft 26 can fly as a secondary payload on large launch vehicles rather than requiring a much more expensive primary payload position on a launch vehicle, such as, for example, a Taurus, Delta II or similar launchers. The use of the Hall thruster ion propulsion and Xenon or other ionized gas fuel also removes the problem of corrosion and contamination from toxic chemical fuels that otherwise could eventually result in damage or destruction of the parent spacecraft.

Hence, the child spacecraft 26 employs the large solar arrays 12 to provide the large amount of needed energy to operate the Hall thrusters. Such provision of energy can be implemented in any number of ways known in the art or future-developed. For example, the solar arrays 12 may deliver 5.5 kilowatts of power either directly to the Hall thrusters or through a power processing unit. Such a design uses standard solar cells available from many manufacturers. The solar arrays have either a single or dual axis of rotation located at the base of the "Y" of the solar array booms. Batteries are provided to enable the spacecraft to operate while in the shadow of the earth or the moon, and are preferably located in the box 15. Note that other embodiments may use a different energy supply or with dual axis gimbaled solar arrays. Higher power solar arrays can also be used depending on the type of mission and Hall thruster power level needed.

Figure 5:
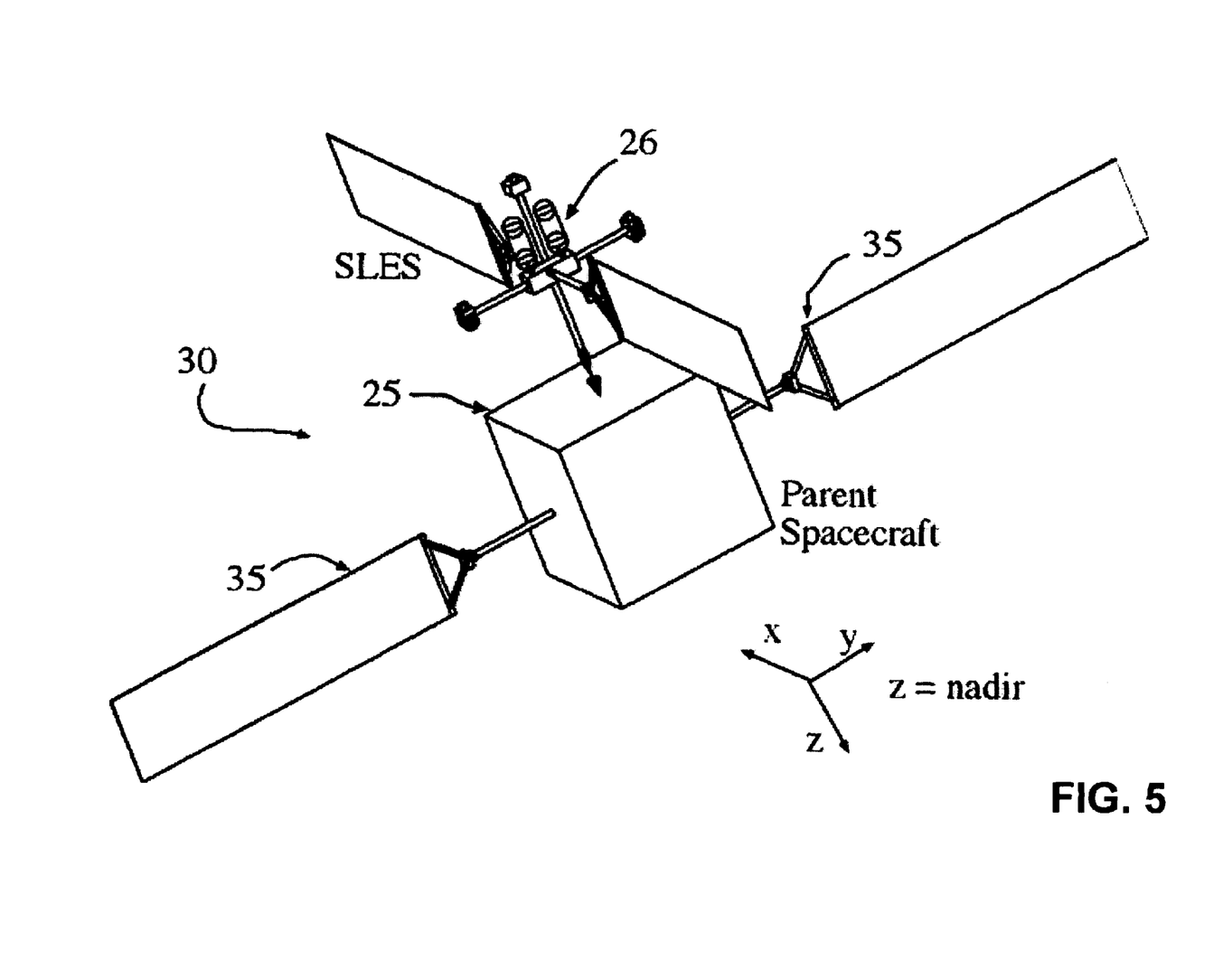
FIG. 5 is a representation of the SLES depicted in FIG. 2 in a docked configuration with a parent spacecraft.

The control box 15 of the exemplary child spacecraft 26 preferably comprises a plurality of components. For example, the control box 15 may comprise a system of momentum management devices that can compensate for attitude displacements sufficient to maintain the stringent pointing requirements of the parent/child spacecraft 30 (FIG. 5). "Pointing requirement" is a term that encompasses the orientation of the satellite with respect to the earth, including, for example, the angle of the satellite with respect to the equatorial plane line 31 (FIG. 1) of the earth 33 (FIG.

1). Such devices are those known in the art or future-developed that compensate for such attitude displacements.

Further, the control box 15 may comprise a navigation system, which includes proximity sensors for controlling the movement and attachment procedures necessary when attaching the child spacecraft 26 to a parent spacecraft 25 (FIG. 5). In addition, the control box 15 may comprise accelerometers for determining the acceleration parameters of the child spacecraft 26. Other components that may also be used are star sensors, GPS receivers or other sensing devices to determine the orbital position and attitude of the child spacecraft and the parent/child spacecraft. The aforedescribed components of the child spacecraft 26 may cooperate via a controller 40 (FIG. 4), described in greater with reference to FIG. 4.

The thrusters 13 and 17 on the extendable booms 16 are used to correct north/south and east/west drift, and such connection method is described further in detail with reference to FIG. 5. In this regard, the thrusters 13 and 17 are controlled such that they fire through a center of mass of a combined parent/child spacecraft 30 (FIG. 5) for north/south correction and parallel to the center of mass for east/west correction. This is accomplished, in an exemplary embodiment of the disclosure, by placing the thrusters 13 and 17 at the end of the booms 16. The boom length is variable, dependent upon the size of spacecraft to be serviced, and are extended via mechanical mechanisms standard to the industry. Increasing the distance between thruster pods 13 and 17 increases the moment arm and therefore minimizes the offset axis of the thrust vector 8a, 8b (FIG. 6), for thruster 19 (FIG. 3).

Figure 3:
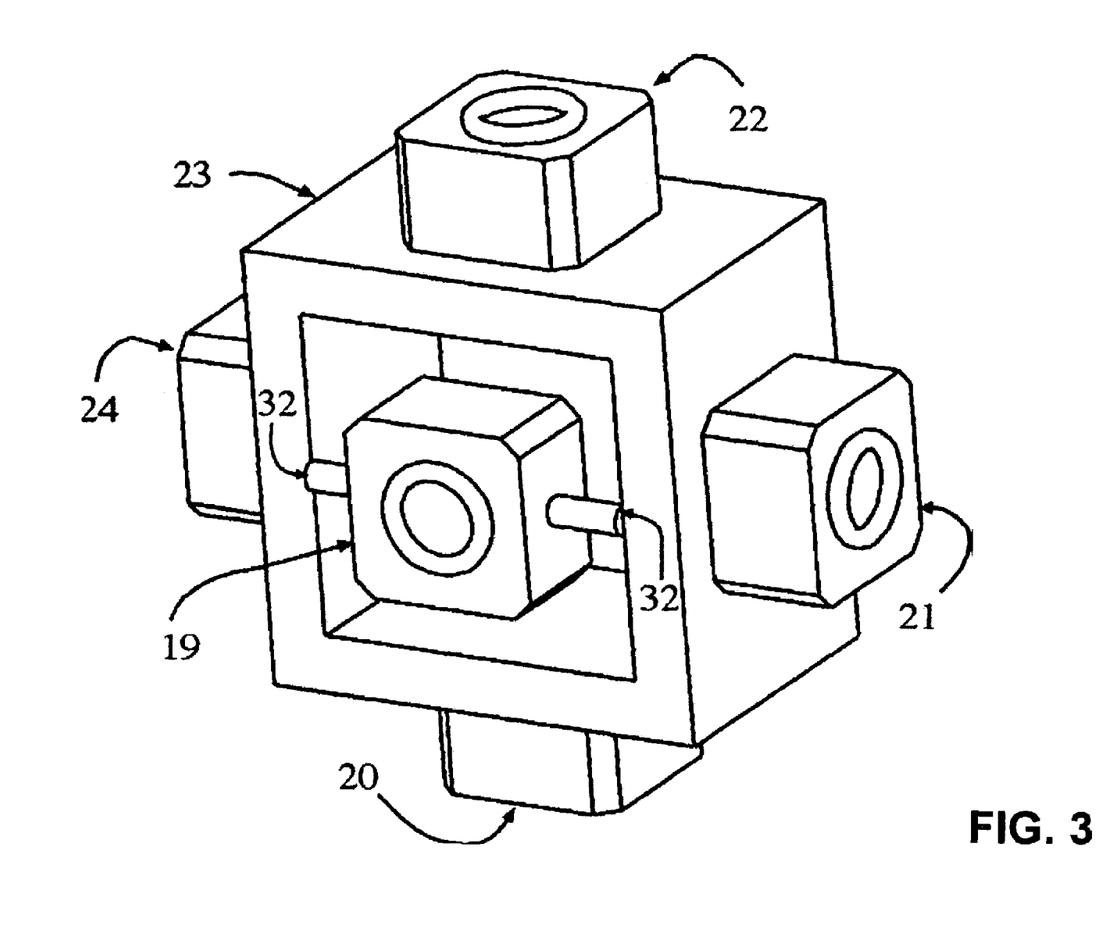
FIG. 3 is a simplified representation of an exemplary boom and mounted thruster pods as shown in FIG. 2.

FIG. 3 provides an illustration of a pod thruster 13 and 17. As shown, each thruster pod 13 and 17 preferably comprises thrusters 19–22, and 24. In some embodiments thrusters can be deleted and compensated for by the primary thruster 11. FIG. 2. A power processor (not shown), if needed, along with divert valves, propellant feed system, and telemetry may be located in the box 23 or control box 15. Note that an exemplary child spacecraft 26 as illustrated in FIG. 2 can be designed for launch on a European Ariane V launch vehicle. However, the system can easily be modified for a different launch vehicle with appropriate mass and volume provisions.

The thruster 19 is rotatably attached to the thruster pod 13 and 17 via a gimbal 32. Therefore, the direction of the thruster when fired can be changed in accordance with a change in the center of mass of a parent/child spacecraft 30 (FIG. 5). This enables the child spacecraft 26 to fire through the center of mass of the parent/child spacecraft 30 (FIG. 5) as the center of mass of the parent/child spacecraft combination 30 (FIG. 5) may change. This could also be accomplished by electrically deflecting the ion beam of the thruster 13 and 17 or a combination of mechanical and electrical deflection. Such outboard thruster 19 is controlled via parent/child center of mass correction logic 60, which is described in more detail with reference to FIG. 4.

The child spacecraft 26 may further comprise visual sensors (not shown). Such visual sensors can be used by the child spacecraft 26 to locate the child spacecraft 26 with respect to a parent spacecraft 25 (FIG. 5). Such visual sensor may be radiation hardened charged coupled device (CCD) cameras configured to provide targeting information, such as, for example range, range rate, and other relevant data that is relevant to the operator on the ground or the on board control system. Such visual sensors can be controlled by control software located in the control box 15.

The control box 15 may comprise a controller, in addition to the other components described. An exemplary controller 40 of the child spacecraft 26 is now described in further detail with reference to FIG. 4. The controller 40 preferably comprises a processing element 42, thrusters and momentum management devices 46, sensor inputs from star field sensors, accelerometers, GPS receivers, earth and sun sensors, or other position and attitude sensing devices 48, a communication and telemetry subsystem 56, and an embedded computer 52. The embedded computer 52 preferably comprises attitude and positioning control logic 58, which controls, for example, cooperation between the navigation system and the momentum management device, and the like.

It should be noted that the logic 60 may be implemented in software, hardware, or a combination thereof. Further, a controller 40 of an exemplary embodiment of the child spacecraft 26 further comprises parent/child center of mass correction logic 60. As illustrated by way of example in FIG. 4, the parent/child correction logic and its associated methodology may be implemented in software and stored in the embedded computer 52 of the system 40. Also, the controller 40 may comprise rendezvous and docking control logic 61 and thruster power system and control logic 62. These control logic functions can be implemented as software, hardware, or a combination of the two.

Note that when implemented in software, parent/child center of mass correction logic 60 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. As an example, the components of the testing logic 108 may be magnetically stored and transported on a conventional portable computer flash memory storage device.

Figure 4:
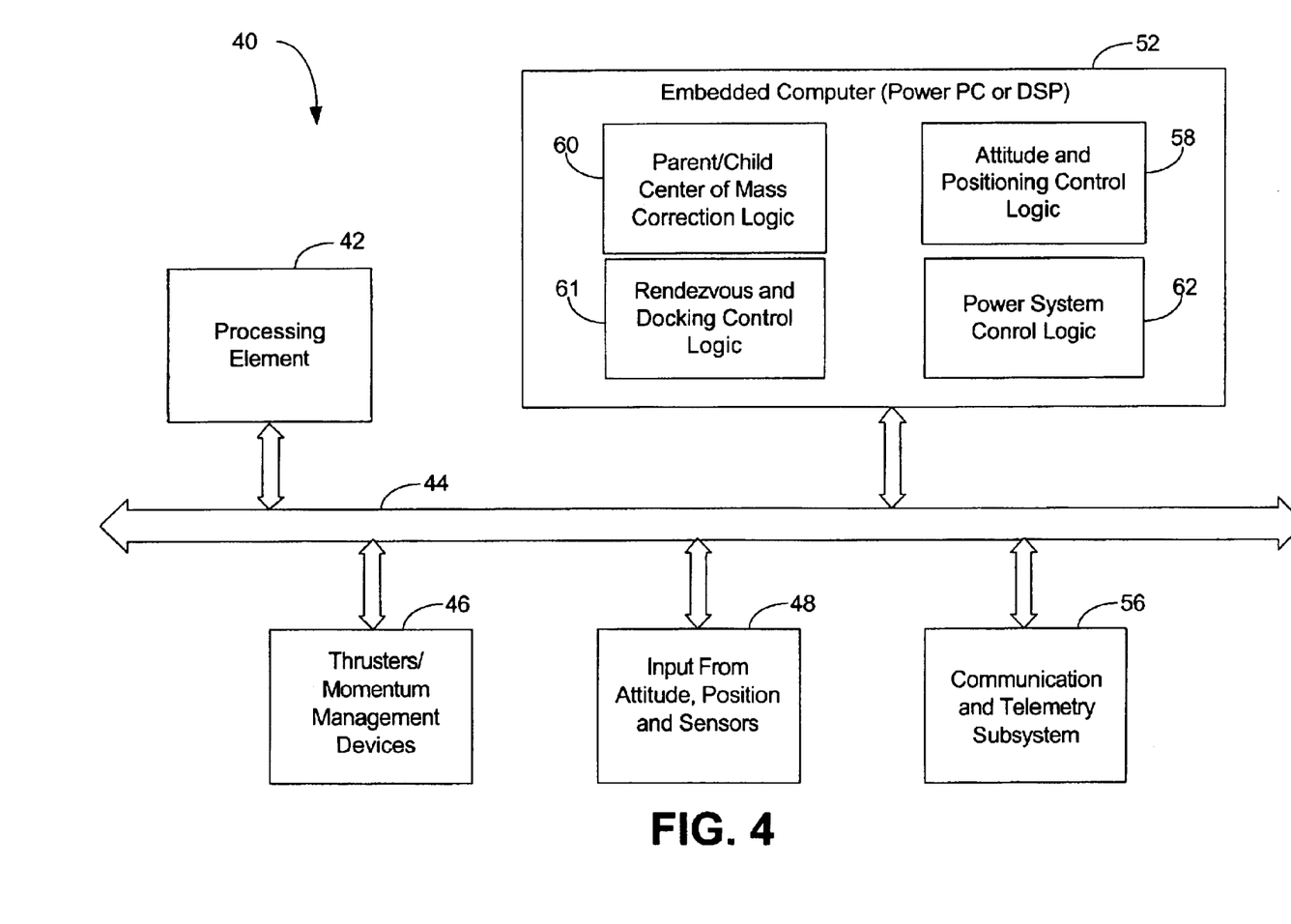
FIG. 4 is a block diagram of functional control logic in accordance with an exemplary SLES of the present disclosure.

An exemplary embodiment of the controller 40 comprises the processing element 42, such as a digital signal processor (DSP) or a central processing unit (CPU), for example, that communicates to and drives the other elements within the system 40 via a local interface 44, which can include one or more buses. The system 40 includes input devices such as star field sensors, accelerometers, GPS receivers, and sun and earth sensors. Thrusters and momentum management devices 46 include control logic (not shown) that controls the valves for the thrusters and switches on or off the momentum management devices. The power system control logic 62 provides the power management and switching needed to provide the right amount of power to the thrusters for their required thrust level. The communications subsystem 56 provides for remote control from the ground and for telemetry data to the ground for operator review and or action. This is routed through processing element 42 where telemetry commands are stored and verified before execution.

The combined parent/child spacecraft 30 is illustrated in FIG. 5. Preferably, the child spacecraft 26 is released in a Geosynchronous Transfer Orbit (GTO). An example orbit would have the parameters of 33,000×500 kilometers at 7 degrees inclination and transfers via the primary thruster 11 (FIG. 2) to a circular orbit of 35,900 kilometers. This orbit is slightly above GEO and is the most efficient use of the low thrust ion propulsion system of the child spacecraft 26. The child spacecraft 26, while in this higher orbit has a lower forward velocity than a GEO spacecraft and "drifts" around the GEO or Clarke belt orbit. When the child spacecraft 26 is within 500 km of the parent spacecraft 25 (FIG. 5) the thrusters of the child spacecraft 26 are used by the rendezvous and docking control logic 61 to lower the orbit to match that of the parent spacecraft 25 to within 40 kilometers.

As the child spacecraft 26 approaches to within 40 kilometers of the parent spacecraft 25 visual acquisition of the parent spacecraft 25 is obtained by either autonomous control via the rendezvous and docking control logic 61 or operator control of the child spacecraft via the communication subsystem 56.

In this regard, the child spacecraft 26 approaches the parent spacecraft 25 from the zenith direction as viewed from an earth-centered reference frame. When the child spacecraft 26 is within 2000 meters of the parent 25, the visual indication input sensors 48 that provides input to the rendezvous and control logic 61 is enabled and a parent visual image, i.e., an image of the parent spacecraft 25, is mapped onto a stored reference model.

When the child spacecraft 26 is within 1 meter of the parent spacecraft 25, the control logic fires the thrusters 13,17 and/or 11 to close the gap and insert the capture tool 14 (FIG. 2) into an apogee nozzle (not shown) of the parent spacecraft 25. Proximity sensors (not shown) on the capture tool 14 preferably enable feedback to an operator or to the rendezvous and docking control logic 58 that the capture tool 14 is within the nozzle. When the capture tool 14 internal proximity sensors indicate maximum penetration of the nozzle, the capture tool 14 initiates lock. An alternative method is accomplished by the use of a cold gas thruster to give higher thrust to the last meter closure with the parent.

The parent/child spacecraft 30 is preferably oriented as defined in FIG. 5. After the child spacecraft 26 attaches to the parent spacecraft 25 forming the parent/child spacecraft 30, the parent spacecraft operator disables the attitude control system (not shown) of the parent 25 and the child spacecraft 26 takes over the attitude control and station keeping of the parent/child spacecraft 30 utilizing attitude and control logic 58. Such assumption of attitude control and station keeping can result in an extension of the life span of the parent spacecraft 26 for up to ten (10) years.

The parent spacecraft 25 can be any type known in the art or future-developed. For example, a parent spacecraft 25 can be a communications satellite that provides direct home services to millions of subscribers, a government-owned satellite that provides data to NASA and Defense Department users, or a weather satellite that provides continuous weather coverage over large segments of the planet. The child spacecraft 26 of the present disclosure can be used in conjunction with any type of parent spacecraft 25, irregardless of the particular function of the parent spacecraft 25 to which it is attaching.

Note that the child spacecraft 26 can dock with the parent spacecraft 25 in geostationary orbit and control both the position and attitude of the parent/child spacecraft 30. As such, the child spacecraft 26 attaches to the parent spacecraft 25 through a simple mechanical interface called a capture tool 14 on FIG. 3. Such an interface is typically not used for refuel, repair, or service of the parent spacecraft 25. Note that the capture tool 14 is any type of capture tool known in the art and future-developed.

Further note that the child spacecraft 26 may dock with a parent spacecraft 25 intended for GEO orbit that has been left stranded in an intermediate orbit by a malfunction of a launch vehicle upper stage or on board propulsion system of the parent spacecraft 25. The child spacecraft 26 is then used to dock to the parent spacecraft 25 and make up the deficit in propulsion and boost the parent/child spacecraft 30 to GEO orbit.

The child spacecraft 26 may dock with a parent spacecraft 25 in GEO orbit that is disabled due to a malfunction or is ready for final retirement. The parent/child spacecraft 30 may then be boosted by the child spacecraft 26 to a disposal orbit that is several hundred kilometers higher than the GEO orbital altitude. This is considered to be the junk orbit by the international satellite operator community due to the inordinate energy required to completely de-orbit a satellite from that altitude.

The child spacecraft 26 may comprise robotic arms, end effectors, and other robotic elements that can be used to repair or service a parent spacecraft 25 in GEO orbit.

The parent/child center of mass correction logic 60 is now described in more detail with reference to FIG. 6 and FIG. 7. Generally, once the child spacecraft 26 attaches to the parent spacecraft 25, then the parent/child spacecraft center of mass correction logic determines the north/south displacement described herein of the parent/child spacecraft 30. This is then fed as an input into the attitude and positioning control logic 58 in order to determine the magnitude and duration of thruster firings to compensate for north/south drift. For correcting attitude errors or dumping momentum from the thrusters 20–22, 24 (FIG. 3), the thrusters 20–22, 24 are fired for the proper duration. Thrusters 20 on thruster pod 13 and 17 are opposite in sign yet redundant with thrusters 22 on thruster pod 13 and 17. Thrusters 21 and 24 are similarly redundant with each other on thruster pods 13 and 17. Thrusters 20 or thrusters 22 are fired simultaneously in order to correct for east/west drift. Alternately thruster 11 can be used as redundant elements with thrusters 22 on thruster pod's 13 and 17. Thrusters 21 and or 24 on thruster pods 13 and 17 are used for roll control of the attitude of the parent/child spacecraft.

Figure 6:
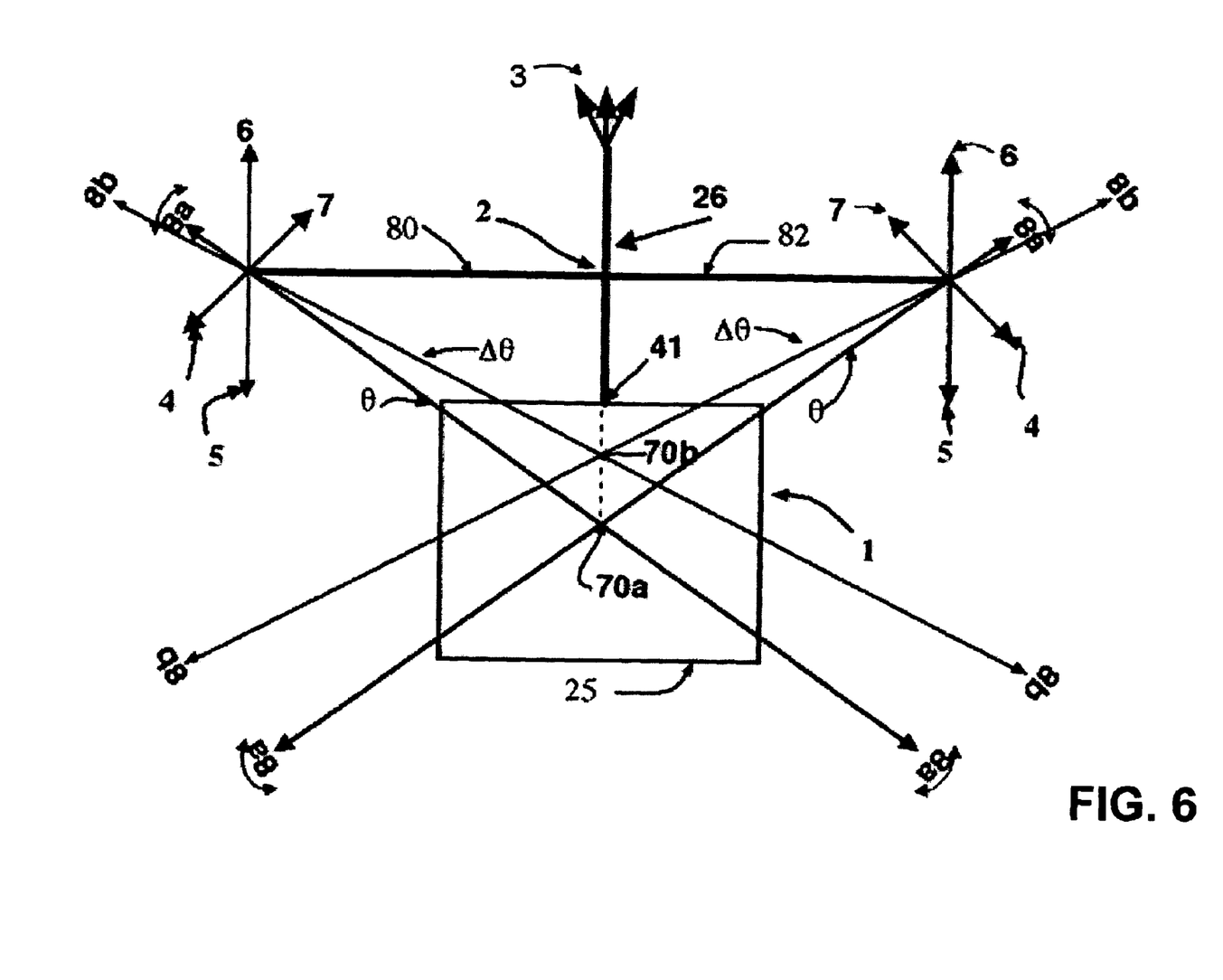
FIG. 6 illustrates directional vectors indicating thrust direction associated with an exemplary propulsion system of the SLES depicted in FIG. 2.
Figure 7:
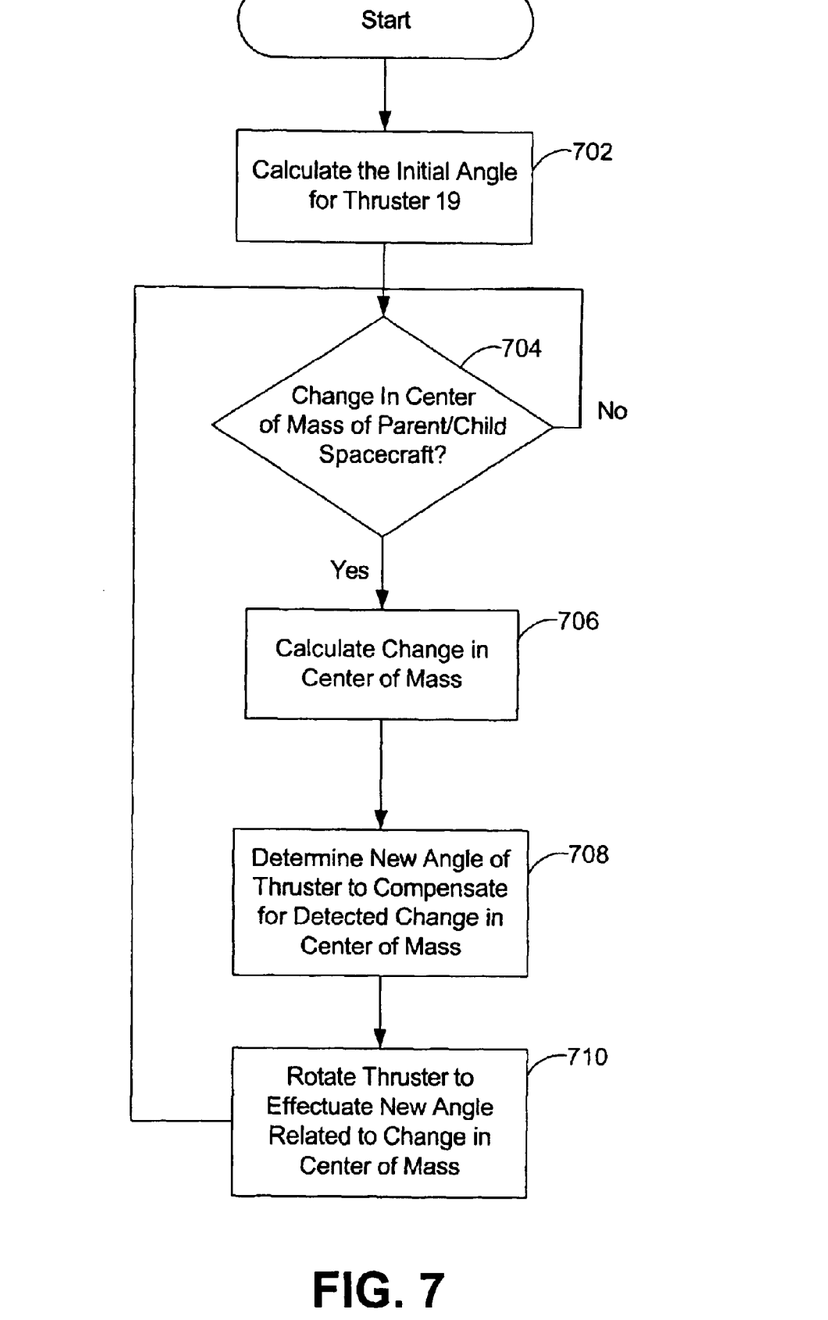
FIG. 7 is a flowchart illustrating the decision logic associated with the process of determining the center of mass of the combined parent/child spacecraft system.

In this regard, FIG. 6 gives a vector representation of the parent/child spacecraft 30. Block 1 represents the parent spacecraft 25 (FIG. 5) having a center of mass alone at point 70a. The child spacecraft 26 is represented by the T-formation 2, which is attached to the block 1 at point 41. The booms 16 (FIG. 2) are represented in FIG. 6 by lines 80 and 82. Likewise, the directions of fire by the thrusters 19 are represented by vectors 8a and 8b, thruster 24 is represented by vector 4, thruster 21 is represented by vector 7, thruster 22 is represented by vector 6, and thruster 20 is represented by vector 5. Primary thruster 11 is represented by the three vectors.

Thus, the child spacecraft 26 attaches to the parent spacecraft 25 by inserting the capture tool 14 into the apogee kick stage nozzle (not shown), which is at the center of mass of the x-y plane, as illustrated in FIG. 5. Thus, the center of mass in the x-y plane of the parent spacecraft 30 is approximately 70a and is consistent with the parent spacecraft center of mass in the x-y plane alone. This also represents the original center of mass before the docking of the child spacecraft. The x-y center of mass remains static, because the child spacecraft 26 attaches to the parent spacecraft 25 at the x-y center of mass of the parent spacecraft 26. However, as indicated in FIG. 6, the center of mass in the z-plane changes. For example, at attachment, the parent/child spacecraft center of mass correction logic 60 determines the center of mass 70b of the initial parent/child spacecraft 30. The logic 60 then calculates the angle θ relative to the tips of the booms 16 and thruster pods 13 and 17 through this initial center of mass.

Angle Δθ represents the angle of rotation of the thruster 19 about the gimbal 32 (FIG. 4). Thus, when the parent/child center of mass correction logic 60 detects a change in the z-plane of the center of mass, for example, from 70b towards original center of mass 70a, the logic 60 then calculates a change Δθ in the angle of rotation of the thruster 19 about the gimbal 32 and the thruster is rotated, accordingly. Thus, the angle θ is determined by determining the center of mass 70b, calculating the change in the angle of the thruster firing for north/south drift correction, then moving the thruster 19 to reflect change in the center of mass of the parent/child spacecraft 30.

An exemplary architecture and functionality of the logic 60 is further described with reference to FIG. 7.

As indicated, the logic 60 first determines an initial angle for which to adjust the angle of thruster 19 that will compensate for the change in center of mass 70 (FIG. 6) of the parent spacecraft 25 when the child spacecraft attaches, as indicated in step 702.

If there is a change in the center of mass of the parent/child spacecraft 30 (FIG. 5), as indicated in step 704, then the logic 60 calculates the new change in center of mass, as indicated in step 706. The logic 60 then calculates the new angle that will correct the thruster to compensate for the change in center of mass 70 (FIG. 6), as indicated in step 708. The logic 60 then rotates the gimbal 32 in order to effectuate the new angle at which the thruster 19 is to fire, as indicated in step 710.

The Δθ angle (FIG. 6) between thruster 19 on the ends of booms 16, thruster pods 13 and 17 and the parent spacecraft 25 exists due to the depletion of positioning fuel from tanks 18 (FIG. 2). This angle will continue to change, necessitating recalculation of the center of mass of the parent/child system on a regular basis.

When a parent spacecraft 25 reaches the end of its fuel life it is either retired to a disposal orbit several hundred kilometers above GEO orbit or it is semi-retired by eliminating the inclination control thereby reducing but not eliminating propulsion requirements. Eventually when fuel is exhausted most if not all of the functionality of the GEO satellite's payload is retained but unable to be used thus the utility of the life extension process.

What is claimed is:

1. A satellite life extension spacecraft (SLES), comprising:
    a mechanical implement adapted for connection to a parent spacecraft, the parent spacecraft having a parent spacecraft center of mass and a connection point configured to receive the mechanical implement;
    a thruster pod extension device;
    a first thruster and a second thruster attached to the thruster pod extension device, the first thruster adapted for rotation; and
    logic configured to launch the SLES from a launch vehicle, guide the SLES to the parent spacecraft, and dock the SLES with the parent spacecraft to create a combined spacecraft by attaching the mechanical implement to the connection point on the parent spacecraft, the logic further configured to calculate a combined spacecraft center of mass of the combine spacecraft and to calculate an angular rotation value for firing the first thruster based on the calculated combined center of mass.

2. The spacecraft of claim 1, wherein the first and second thrusters are pivotally affixed to a first and second thruster pod, each thruster adapted for rotation about a rotational axis.

3. The spacecraft of claim 2, wherein the logic is further configured to dynamically calculate the center of mass of the parent/child spacecraft when the mechanical implement is coupled to the connection point.

4. The spacecraft of claim 3, wherein the logic is further configured to calculate a first angle of rotation about the rotational axis corresponding to the center of mass calculated.

5. The spacecraft of claim 4, wherein the logic is further configured to detect a change in the center of mass and calculate a second angle of rotation about the rotational axis corresponding to the change in the center of mass.

6. The spacecraft of claim 1, wherein the thruster pod comprises at least one second thruster, the second thruster rigidly affixed to the thruster pod.

7. A spacecraft positioning method, the method comprising the steps of:
    launching a first spacecraft within docking distance of a second spacecraft, the second spacecraft having a first center of mass;
    guiding the first spacecraft to the second spacecraft;
    attaching the first spacecraft to the second spacecraft to obtain a combined spacecraft;
    calculating a combined spacecraft center of mass, the combined spacecraft center of mass reflecting a change from the first center of mass;
    calculating an angle of rotation of a thruster pod about a gimbal related to the combined center of mass calculated; and
    changing the angle of rotation of the thruster to reflect a change from the first center of mass to the combined center of mass.

8. The method of claim 7, further comprising the steps of:
    calculating a first firing direction and a first magnitude of force for a fixed thruster; and
    calculating a second firing direction and a second magnitude of force or a gimbaled thruster.

9. The method of claim 8, wherein calculating the first firing direction and calculating the second firing direction are based upon the center of gravity calculated.

10. A system, comprising:
    a parent spacecraft comprising a connection device, the parent spacecraft having a first center of mass;
    a child spacecraft comprising a capture tool such that the child spacecraft can be launched and attached to a connection point of the parent spacecraft when the parent spacecraft is in Geosynchronous orbit, the child spacecraft further comprising a first rotatable thruster and a controller, the controller configured to calculate a second center of mass when the child spacecraft is connected to the parent spacecraft and rotate the thruster based on the calculated second center of mass.

11. The system of claim 10, wherein the child spacecraft comprises a thruster pod for housing the thruster.

12. The system of claim 11, wherein the thruster pod is attach to an extendable boom configured to extend in order to compensate for various parent spacecraft sizes.

13. The system of claim 12, wherein the child spacecraft comprises a plurality of thrusters and corresponding thruster pods, each thruster capable of rotation by the controller in order to compensate for the second center of mass when the controller connects the child spacecraft to the parent spacecraft.

14. The system of claim 10, wherein the child spacecraft is configured to determine the center of mass of the parent spacecraft.

15. The system of claim 14, wherein the child spacecraft is configured to determine the second center of mass based upon the first center of mass.

16. The system of claim 15, wherein the child spacecraft further comprises an extendable boom having a first end and a second end.

17. The system of claim 16, wherein the extendable boom is connected to the rotatable thruster at the first end and a second rotatable thruster at the second end.

18. The system of claim 17, wherein the controller calculates first angle corresponding to the first rotatable thruster and a second angle corresponding to the second rotatable thruster, the first and second angles calculated such that each thruster fires through the second center of mass.

19. The system of claim 18, wherein the controller periodically recalculates the first and second angle of the first and second thrusters in order to correct for a change in center of mass based upon fuel usage.

* * * * *